Nov. 15, 1949     E. J. SCHAEFER     2,488,437
PERMANENT MAGNET EXCITED ROTOR
Filed Feb. 19, 1945
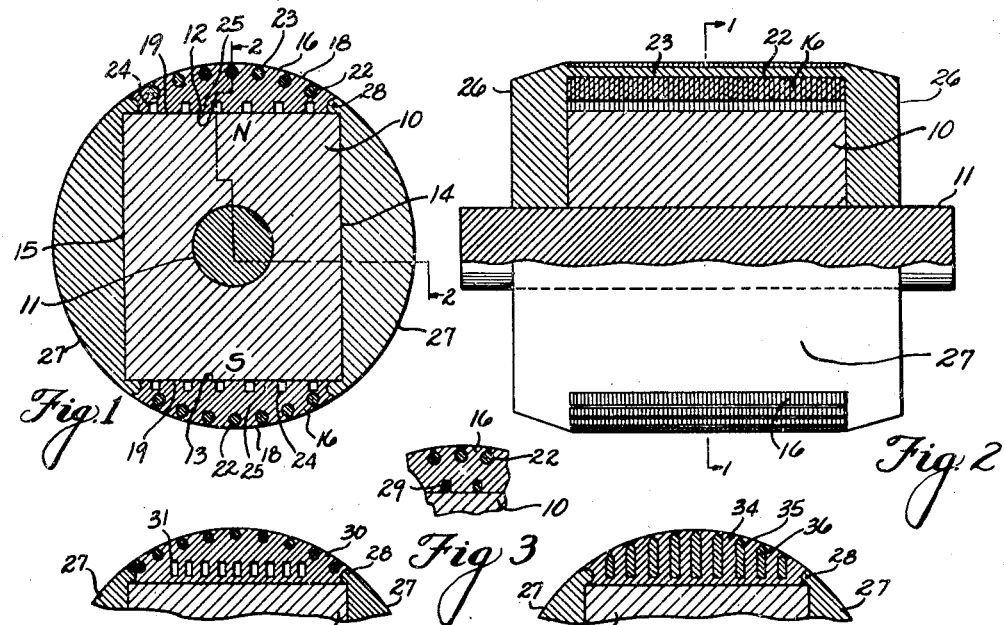
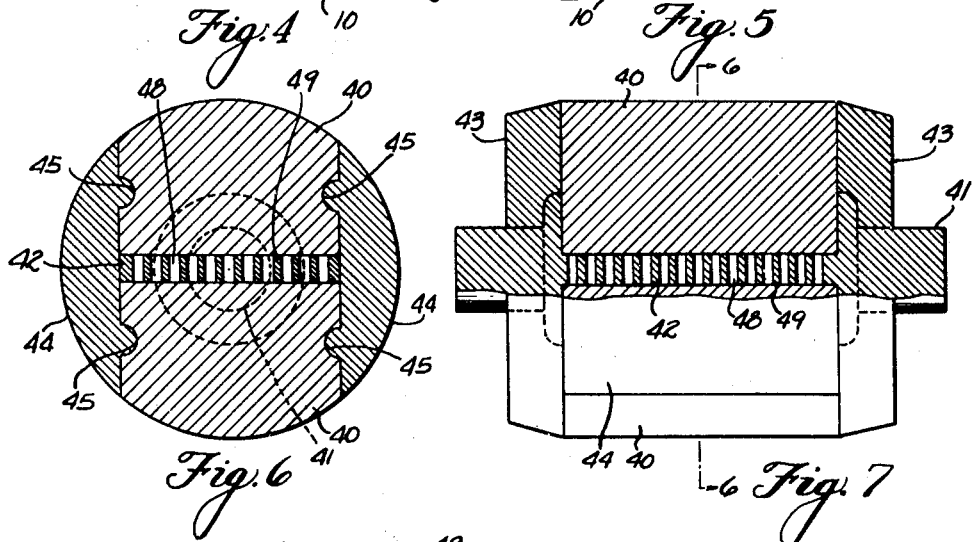
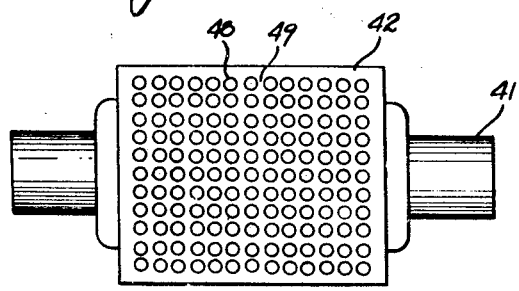
INVENTOR.
Edward J Schaefer
BY Hoodling and Kroat
attys Patented Nov. 15, 1949

2,488,437

UNITED STATES PATENT OFFICE 2,488,437

PERMANENT MAGNET EXCITED ROTOR

Edward J. Schaefer, Fort Wayne, Ind.

Application February 19, 1945, Serial No. 578,606

13 Claims. (Class 171—209)

My invention relates in general to rotors for dynamo-electric machines and more particularly to rotors having a permanent magnet field.

It is well known in the electrical art relating to the design of permanent magnet excited alternators that there is a demagnetizing effect on the permanent magnet due to a reaction electromatic force originating in the armature windings when the alternator carries load. This demagnetizing action has two important effects, (a) a permanent weakening of the permanent magnet from which it does not recover unless subjected to a renewed magnetizing force and (b) a recurring demagnetizing action which weakens the field each time a load is applied to the alternator but from which it recovers to its original strength when the load is removed. The net result is a change of generated voltage with load, that is, the alternator has poor voltage regulation.

Therefore, it is an object of my invention to reduce to a large extent both of the above mentioned effects.

Another object of my invention is to improve the voltage regulation of the alternator.

Another object of my invention is to provide in the flux path of the rotor a magnetizable body comprising soft iron having a constricted portion designed to saturate at a predetermined value of the flux for limiting the flux to a predetermined maximum value.

Other objects and a fuller understanding of my invention may be had by referring to the following description and claims, taken in conjunction with the accompanying drawing, in which:

Figure 1 is a cross-sectional view of a rotor embodying the features of my invention taken along the line 1—1 of Figure 2;

Figure 2 is an elevational side view of my rotor with substantially the upper half shown in cross-section, the cross-section being taken along the line 2—2 of Figure 1;

Figure 3 is a fragmentary view of a portion of Figure 1 showing the slots next adjacent to the permanent magnet filled with current conducting material;

Figure 4 is a fragmentary view similar to the upper portion of Figure 1, but showing the slots removed from the bottom surface of the pole face core;

Figure 5 is a view similar to Figure 4 but showing a further modified form of the pole face core;

Figure 6 shows another modified form of my rotor, being a cross-section taken along the line 6—6 of Figure 7;

Figure 7 is an elevational side view of my rotor shown in Figure 6 with substantially the upper half thereof shown in cross-section taken along the vertical center thereof; and Figure 8 is a plan view of the shaft employed in the rotor shown in Figures 6 and 7.

With reference to the drawing, the permanent magnet field element is indicated by the reference character 10 and may be cast or otherwise produced about a shaft 11. The permanent magnet field element may be in the form of a solid core and cast or otherwise suitably made of material which when magnetized has a high magnetic retentivity and which will have the property of maintaining the magnetism over a long period of time. Present materials having this property are extremely hard and brittle.

The windings for my rotor are superimposed externally of the permanent magnet field element with the result that with my type of construction there is no need to slot the external surface of the magnet to receive the windings. Such slotting would not only be difficult to perform mechanically, but would also materially weaken the magnet both mechanically and magnetically. In Figure 1 of the drawing, I have illustrated two pole faces disposed substantially 180° apart; namely, a north pole which is indicated by the letter N and a south pole which is indicated by the letter S, but it is to be understood that my invention applies equally well to a larger number of pole faces. The end surface at the north pole region is indicated by the reference character 12 and the end surface at the south pole region is indicated by the reference character 13. The two sides 14 and 15 of the permanent magnet field element comprise interpole regions.

Mounted upon each of the end surfaces of the pole regions are pole face cores 16 which comprise an outer cylindrical surface 18 and a flat surface 19. The cylindrical surface 18 and the flat surface 19 comprise substantially a segment of a circle. The cylindrical surface 18 comprises a portion of the periphery of the rotor and the flat surface 19 is disposed to abut against the end surfaces of the pole regions of the permanent magnet field element. The peripheral marginal edge surface of the pole face cores 16 are provided with a plurality of distributed peripheral slots 22 in which are mounted current conducting bars 23 which have their ends connected to end rings 26 mounted upon each end of the rotor. The current conducting bars 23 in combination with the end rings constitute short circuited distributed windings. The purpose of the short circuited distributed windings and the pole face lamination cores is to damp out and prevent penetration of the armature reaction magnetomotive forces to the permanent magnet field element 10 and thus to minimize the permanent de-magnetizing action of the forces.

Mounted against each of the sides 14 and 15 which constitute the interpole region are heavy current conducting members 27 which have their ends connected to the end rings 26. The heavy current conducting members 27 in combination with the end rings constitute a heavy short circuited turn around the interpole region of the permanent magnet field element 10. As shown in Figure 1, the pole face cores 16 are held against the ends of the permanent magnet field element 10 by means of an interlocking engagement 28 provided between the pole face cores 16 and the heavy current conducting members 27 which are cast about the permanent magnet field element. As shown in Figures 1 and 2, the heavy current conducting members 27, the current conducting bars 23 and the end rings are all cast integrally with each other to make a strong core construction. The purpose of the heavy short circuited turn is to prevent de-magnetization of the permanent magnet under transient or short circuit conditions of the alternator.

The pole face cores 16 are preferably constructed of soft iron laminations which may be stacked together to make up the entire core unit. In order to give improved voltage regulation, I provide in the flux conducting material of the pole face cores a plurality of distributed auxiliary or saturating slots 24 which produce a constricted portion therebetween designed to saturate at a predetermined value of the flux for limiting the flux to a predetermined maximum value. The function of the auxiliary slots 24 is distinct from that of the conducting bar slots 22. The auxiliary slots 24 are so proportioned that when the alternator carries the load for which it is designed the laminations are on the verge of saturation at the sections constricted indicated by the reference character 25. When the load is removed from the alternator the demagnetizing effect disappears and the flux tends to increase. The saturation of the pole face lamination cores at the constricted sections 25 caused by the auxiliary slots greatly minimizes this increase since it obstructs the flow of the greater flux. The generated voltage of the alternator therefore tends to remain constant and its voltage regulation is consequently improved. It is particularly noted that the soft iron pole face cores extend over only a portion of the total rotor periphery; namely, only over the end surfaces 12 and 13 which constitute the pole regions. It is undesirable to extend this pole face structure from pole to pole because of the harmful leakage of flux which would greatly decrease the flux available for generating voltage. I have found that the soft iron pole face cores should cover approximately 40 to 80% of one pole pitch to give the best results.

In Figure 3 I show the auxiliary or saturating slots 24 being filled with current conducting bars 29 which have their ends integrally joined with the end rings 26. In Figure 3 the auxiliary or saturating slots 24 function susbtantially the same as the slots shown in Figure 1 to give improved voltage regulation.

It is to be understood that the auxiliary or saturating slots need not be in the exact location shown in Figures 1 and 3, and thus in figure 4 I have shown a modified pole face core 30 having auxiliary or saturating slots 31 disposed away from the surface of the pole face core which abuts against the end of the permanent magnet field.

In Figure 5 I show another modified arrangement of the auxiliary or saturating slots and in this view the pole face core 34 comprises a plurality of deep slots 35 filled with current conducting bars 36 which may be cast integrally with the end rings. In this construction the deep slots produce constricted sections designed to be saturated at a predetermined value of flux for limiting the flux to a predetermined maximum value for giving improved voltage regulation.

In Figures 6, 7 and 8 I illustrate another embodiment of my rotor having constricted soft iron sections in the path of the flux for giving improved voltage regulation. In this embodiment of my invention, the permanent magnet field element comprises two block members 40 disposed on opposite sides of an intermediate portion 42 of a shaft 41. As illustrated, the intermediate portion 42 of the shaft comprises a plate-like structure having a plurality of openings 48 therein to provide constriction sections 49 therebetween. The sides of the permanent magnet block member 40 are provided with longitudinal grooves 45 whereby when the heavy current conducting members 44 are cast thereabout, the interlocking engagement between the cast material and the longitudinal grooves holds the block members securely against the opposite side of the intermediate portion 42 of the shaft. The heavy current conducting members 44 are preferably cast integrally with the end rings 43 which abut against the ends of the permanent magnet. The operation of the rotor shown in Figures 6, 7 and 8 is substantially the same as that described for the previous views of the drawing, in that the constricted sections 49 between the openings 48 of the intermediate portion 42 of the shaft are designed to saturate at a predetermined value of flux for limiting the flux to a predetermined maximum value with the result that the generated voltage of the alternator therefore tends to remain constant which gives improved voltage regulation. In all of the forms of my invention, it is to be noted that I provide in the flux path means including soft iron having a constricted portion designed to saturate at a predetermined value of the flux for limiting the flux to a predetermined maximum value to give improved voltage regulation of the alternator.

The electrical conducting material may consist of any suitable material of a low electrical resistance such for example as copper or aluminum. In the drawing, I have indicated the rotor of the alternator as being provided with the permanent magnet structure, although the wound part of the alternator could be made the rotating member with equal effectiveness.

In the description, the outer surface 18 of the pole face cores is preferably described and shown as being cylindrical, but it is to be understood that this outer surface may be of any form or shape. Sometimes it is advantageous to vary the shape from the cylindrical in order to obtain a desired variation in wave shape.

Although I have described my invention with a certain degree of particularity, it is understood that the present disclosure has been made only by way of example and that numerous changes in the details of construction and the combination and arrangement of parts may be resorted to

I claim as my invention:

1. A rotor comprising a permanent magnet field element having pole surface regions, pole face cores mounted to said element and embracing respectively said pole surface regions, end rings for said rotor, said cores comprising soft iron laminations and having short circuited distributed windings connected to said end rings, said cores each having a constricted portion in the flux carrying section between the said windings and the permanent magnet field element, said restricted portion being designed to saturate at a predetermined value of flux for limiting the flux to a predetermined maximum value.

2. A rotor comprising a permanent magnet field element having pole surface regions, pole face cores respectively for said pole surface regions, each said cores comprising soft iron laminations having a first surface constituting a portion of the periphery of said rotor and a second surface for engaging a pole surface region, end rings for said rotor, said cores each having a first plurality of slots disposed adjacent said first surface and a second plurality of slots disposed adjacent said second surface, said first plurality of slots having a short circuited distributed winding therein connected to said end rings and said second plurality of slots forming restricted portions therebetween designed to saturate at a predetermined value of flux for limiting said flux to a predetermined maximum value, said end rings on the rotor connecting the distributed windings together.

3. A rotor comprising a permanent magnet field element having pole surface regions, pole face cores respectively for said pole surface regions, said cores each comprising soft iron laminations and having a first surface constituting a portion of the periphery of said rotor and a second surface for engaging a pole surface region, end rings for said rotor, said cores each having a first plurality of slots disposed adjacent said first surface and a second plurality of slots disposed adjacent said second surface, said slots having electrical conducting bars therein with ends connected to said rings.

4. A rotor comprising a permanent magnet field element having pole surface regions, pole face cores respectively for said pole surface regions, said cores each comprising soft iron laminations and having a first surface constituting a portion of the periphery of said rotor and a second surface for engaging a pole surface region, end rings for said rotor, said cores each having a plurality of deep slots extending substantially from the first surface to the second surface, said slots having electrical conducting bars therein with ends connected to said end rings.

5. A rotor comprising a permanent magnet field element having first and second pole surface regions, a first pole face core adjacent the first pole surface region, a second pole face core adjacent the second pole surface region, said cores each comprising soft iron laminations and having a short circuited distributed winding carried thereby, end rings interconnecting said windings, said cores each having a saturatable portion between the said winding carried thereby and the permanent magnet field element.

6. In a rotor the provision of a permanent magnet having a flux path, means comprising soft iron in said flux path only, said iron having restricted portions designed to saturate at a predetermined value of the flux for limiting the flux to a predetermined maximum value and means directly engaging said permanent magnet and establishing a heavy short-circuited turn on each side of the flux path.

7. A rotor comprising a permanent magnet field element composed of at least two block members, means comprising soft iron between said block members, said iron having restricted portions designed to saturate at a predetermined value of the flux for limiting the flux to a predetermined maximum value.

8. A rotor comprising a permanent magnet field element composed of at least two block members, a shaft having an intermediate portion disposed between said block members, said intermediate portion comprising iron and having restricted portions designed to saturate at a predetermined value of the flux for limiting the flux to a predetermined maximum value.

9. A rotor comprising a permanent magnet field element having pole surface regions and interpole surface regions, said element comprising at least two block members, a shaft having an intermediate portion disposed between said block members, said intermediate portion comprising iron and having restricted portions designed to saturate at a predetermined value of the flux for limiting the flux to a predetermined maximum value, end rings for the rotor, and heavy current conducting members interconnecting the end rings, said end rings and said heavy current conducting members constituting a heavy short circuited turn surrounding the interpole surface regions of the field element.

10. A roto comprising a permanent magnet field element having pole surface regions and interpole surface regions, said element comprising at least two block members, a shaft having an intermediate portion disposed between said block members, said intermediate portion comprising iron and having restricted portions designed to saturate at a predetermined value of the flux for limiting the flux to a predetermined maximum value, end rings for the rotor, and heavy current conducting members interconnecting the ends rings, said end rings and said heavy current conducting members constituting a heavy short circuited turn surrounding the interpole surface regions of the field element, said end rings and said heavy current conducting members being cast about the rotor and holding the block members on the intermediate portion of the shaft.

11. A rotor comprising a permanent magnet field element having end pole surface regions and side interpole surface regions, said end and side surface regions being angularly disposed with respect to each other, pole face cores respectively for said pole surface regions, said cores each comprising soft iron laminations and having a first surface constituting a portion of the periphery of said rotor and a second surface for engaging a pole surface region, end rings for said rotor, said cores each having a plurality of distributed winding members interconnecting said end rings, and heavy current conducting members respectively disposed against the side surface regions of the field element and interconnecting the said end rings, said end rings and said heavy current conducting members being cast about the field element and having interlocking portions with the said pole face cores to hold the said cores against said end pole surface regions.

12. In a rotor the provision of a permanent magnet having pole regions establishing a flux path and having interpole regions on each side of the flux path, means comprising soft iron disposed only in the flux path and having provided in the said flux path restricted portions designed to saturate at a predetermined value of flux for limiting the flux to a predetermined maximum value, and heavy short circuited means directly engaging the permanent magnet in the interpole regions.

13. In a rotor the provision of a permanent magnet having pole regions establishing a flux path and having interpole regions on each side of the flux path, a soft iron portion disposed only in the flux path and having provided in said flux path restricted portions designed to saturate at a predetermined value of the flux for limiting the flux to a predetermined maximum value, end rings for the rotor, and heavy current conducting members interconnecting the end rings and directly engaging the permanent magnet, said members and said end ring constituting a heavy short-circuited turn in the interpole regions.

EDWARD J. SCHAEFER.

REFERENCES CITED

The following references are of record in the file of this patent:

UNITED STATES PATENTS

| Number | Name | Date |
|---|---|---|
| 608,309 | Steinmetz | Aug. 2, 1898 |
| 830,262 | Torda | Sept. 4, 1906 |
| 2,193,406 | Goss | Mar. 12, 1940 |
| 2,303,893 | Mullner | Dec. 1, 1942 |

FOREIGN PATENTS

| Number | Country | Date |
|---|---|---|
| 212,619 | Great Britain | Mar. 10, 1924 |
| 463,813 | Great Britain | Apr. 7, 1937 |